United States Patent [19]
Conrad

[11] 3,972,414
[45] Aug. 3, 1976

[54] SELF-CENTERING IDLER ROLLERS FOR TROUGHING CONVEYER BELTING

[75] Inventor: Rene Conrad, Foster City, Calif.

[73] Assignee: Dynaloc Corporation, San Mateo, Calif.

[22] Filed: June 3, 1974

[21] Appl. No.: 475,667

Related U.S. Application Data

[63] Continuation-in-part of Ser. No. 282,331, Aug. 21, 1972, abandoned.

[52] U.S. Cl............................. 198/202; 198/192 R; 74/241
[51] Int. Cl.²......................................... B65G 15/62
[58] Field of Search........... 198/192 R, 202; 74/240, 74/241

[56] References Cited
UNITED STATES PATENTS

| | | | |
|---|---|---|---|
| 1,980,777 | 11/1934 | Zollinger | 198/202 |
| 2,132,053 | 10/1938 | Sollenberger et al. | 198/202 |
| 3,661,246 | 5/1972 | Faunce et al. | 198/202 |
| 3,713,348 | 1/1973 | Conrad et al. | 74/240 |

*Primary Examiner*—Evon C. Blunk
*Assistant Examiner*—Joseph E. Valenza
*Attorney, Agent, or Firm*—Boone, Schatzel & Hamrick

[57] ABSTRACT

Spirally-tending ribbing on the medial and angular idler rollers of a troughing conveyer including waveform ribbing on the medial roller and normal ribbing on the inner halves of the angular idler rollers for spreading the belting outwardly from center and oppositely-tending spiral ribbing on the outer halves of the angular idler rollers due to lateral shifting of the center of gravity of the material on the belting toward one or the other sides of the trough-formed belting. The oppositely-tending spiral ribbing being of a scalloped type affording more positive traction against the belting especially upon shifting of the load of material on the belt toward an edge thereof over one or the other of the angular idler roller. For extreme cases of such outward climbing of the belting, a feather touch idler roller is set wedge-like relative to the outer halves of the angular idler rollers for effecting greater traction of the belt edge against the latter.

15 Claims, 10 Drawing Figures

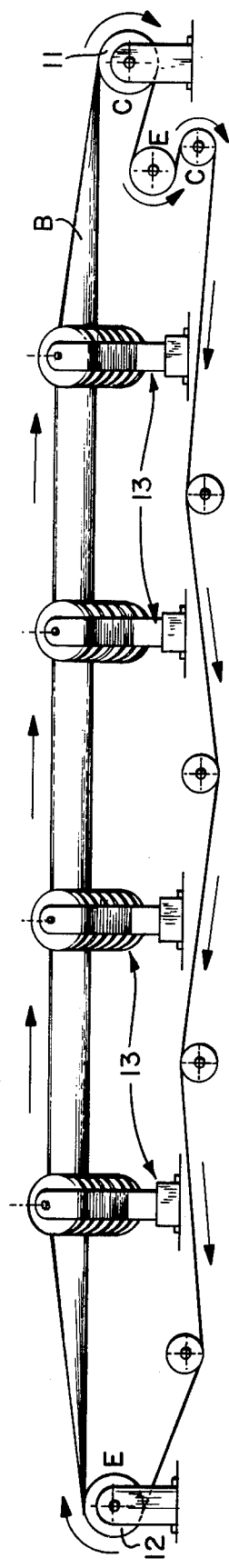
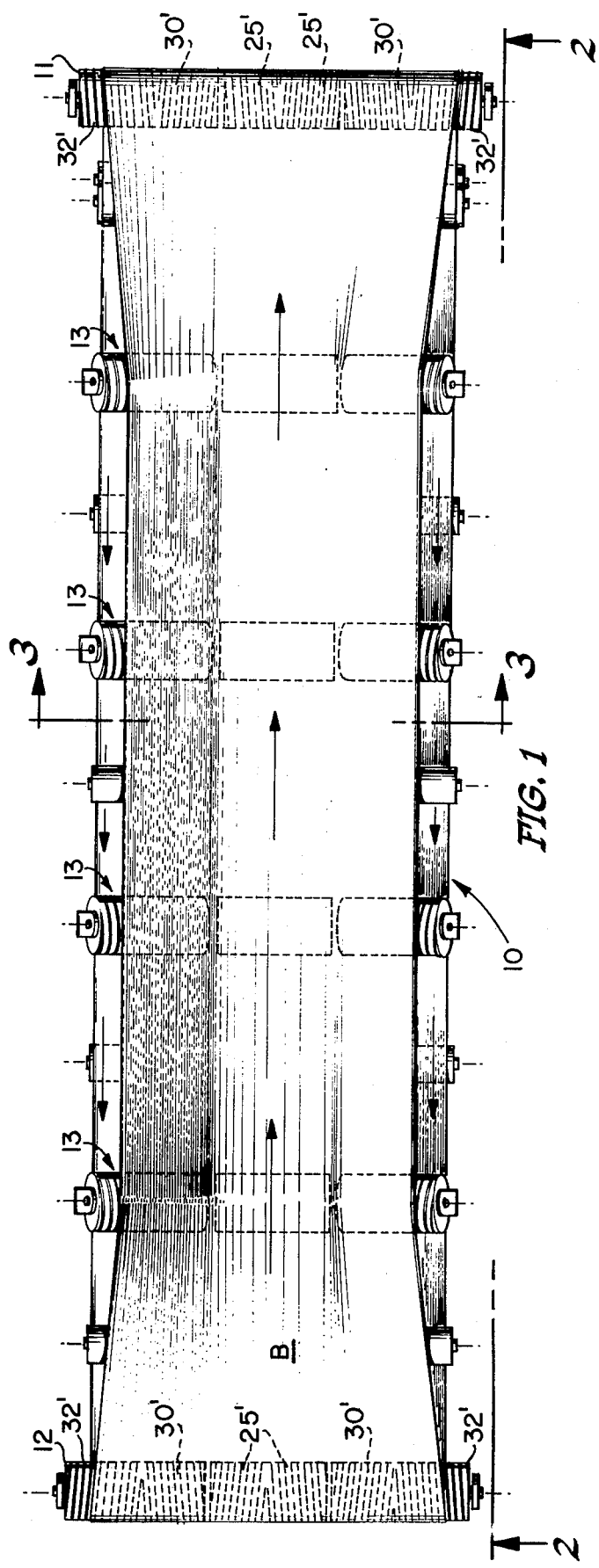

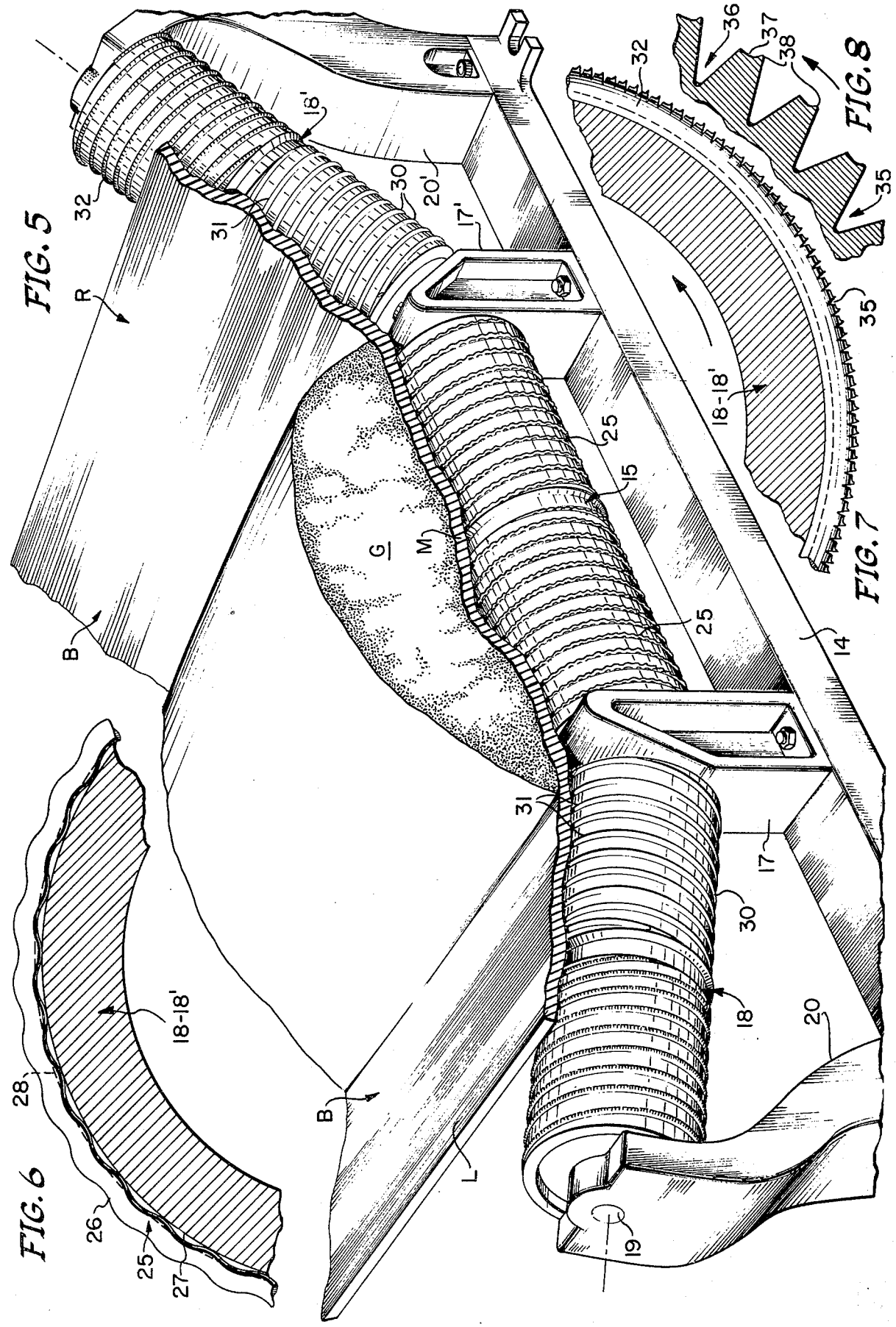

SELF-CENTERING IDLER ROLLERS FOR TROUGHING CONVEYER BELTING

This application is a Continuation-in-Part of my co-pending application of like title, Ser. No. 282,331, filed Aug. 21, 1972, now abandoned.

BACKGROUND

This invention relates to endless flexible belt conveyors and more particularly to troughing conveyers for receiving and carrying granular or shiftable materials.

Troughing conveyers are used in mining and quarry operations for receiving sand, gravel, rock, coal and such loose pourable, shiftable material. Troughing conveyers are also used for handling and carrying granular material such as grain, beans and the like which have a tendency to slump or spread due to vibrations during movement on conveyor belting.

Due to the tendency of such material to flow, spread and shift by gravity in the course of movement, it has become conventional to provide intermediate sets of idler rollers in conveyor systems to support side edges of the flexible conveyor belting in a canted or angular condition so as to form a trough lengthwise the load-carrying reach of such belting. A typical arrangement of idler rollers for a troughing conveyor is shown in U.S. Pat. No. 2,743,810 which issued to Armstrong, May 1, 1956. The Armstrong patent discloses the use of spirally-grooved rollers for tending to center the belting as a trough for conveying loose granular material. The jist of the invention in the Armstrong patent resides in providing hollow walled idler rollers mainly for absorbing the impact or shock from the material falling onto the belting. So far as the tracking is concerned, Armstrong relies solely on the spiral grooving and rubber belting for good tracking. This however, assumes that the load remains centered in the troughing conveyor and fails to account for the shifting or tendency for the granular material to gravitate toward one or the other slanted edges of the belt. Such shift of the load causes greater weight and traction between the belt and rollers on the loaded side and release of tracking action on the unloaded side of the belting.

SUMMARY OF THE PRESENT INVENTION

It is an object of the present invention to provide more positive tracking between the idler rollers and belting of a troughing conveyer. Accordingly it is an object of this invention to provide in a troughing conveyor, idler rollers having medial tracking portions tending to spread the belting equally from center of the trough-formed belt, and means at the extremities of such idler rollers for counteracting the spreading action at the medial rollers.

It is another object to provide trough forming idler roller units with medial rollers having waveform ribbing spirally tending from center outwardly toward each end thereof for effecting a self-centering action to the horizontal portion of the troughed belting. In conjunction with the foregoing, it is an object to provide the lower, inner portion of each side wall idler roller with ribbing spirally tending outwardly to assist the medial roller in self-centering and spreading the troughed belting outwardly from belt center.

It is yet another object to provide each slanted side wall roller of each belt troughing unit with inwardly-tending spiralled ribbing on its outer, upper half for counteracting the spreading action of the ribbing on the medial roller and each inner, lower end of the slanted side wall rollers thereof. In this connection it is a further object to provide the inwardly-tending spiralled ribbing on the outer extremity of each slanted side wall roller with a scalloped tangent belt engaging surface for creating a more positive traction between the latter and the portion of the belting engaged thereby. This object further contemplates the provision of belt engaging lands between each scalloped recess in the tangent of such ribbing as well as a tooth-like barb of crescent shape on the trailing side of each recess for effecting more positive traction with the surface of the belt engaged thereby.

It is a still further object to provide auxiliary rollers adjacent each slanted side wall roller of the troughing units for effecting a feather touch with an edge of the belting when the latter has climbed the side wall roller beyond an allowable limit to assist the belt-centering rollers in effecting self-centering action of the troughed belting.

It is yet another object to dispose such auxiliary rollers with their axes at an acute angle relative to the adjacent slanted side wall roller to form therewith a V-shaped valley therebetween and to maintain the belt edge engaged by such auxiliary roller in contact with the inwardly-tending spiralled ribbing on the adjacent side wall roller. In this connection the angular disposition of each auxiliary roller relative to its adjacent slanted side wall roller is on that side of the latter where the belting is leaving contact therewith such that the auxiliary roller effects a partial wrap around engagement of the undersurface of the belting with the spirally-tending ribbing over a greater area thereof.

These and other objects and advantages of the present invention will become more apparent from a reading of the following description and claims in light of the accompanying three sheets of drawings in which:

FIG. 1 is a plan view of a troughing conveyor embodying the self-centering positive traction features of the present invention;

FIG. 2 is a side elevation of the troughing conveyor of FIG. 1 as seen from line 2—2 therein;

FIG. 5 is an enlarged fragmentary perspective view of one set of idler rollers and a portion of the troughed conveyor belting in relation thereon;

FIG. 6 is a fragmentary segmental section through a portion of the medial roller showing the waveform of beading therefor;

FIG. 7 is an enlarged segmental section through the extreme end of the slanted side rollers and the counteracting ribbing thereof;

FIG. 8 is an enlarged section through the toothed bead of the tangently-scalloped beading shown in FIG. 7;

GENERAL DESCRIPTION

Figure 3:
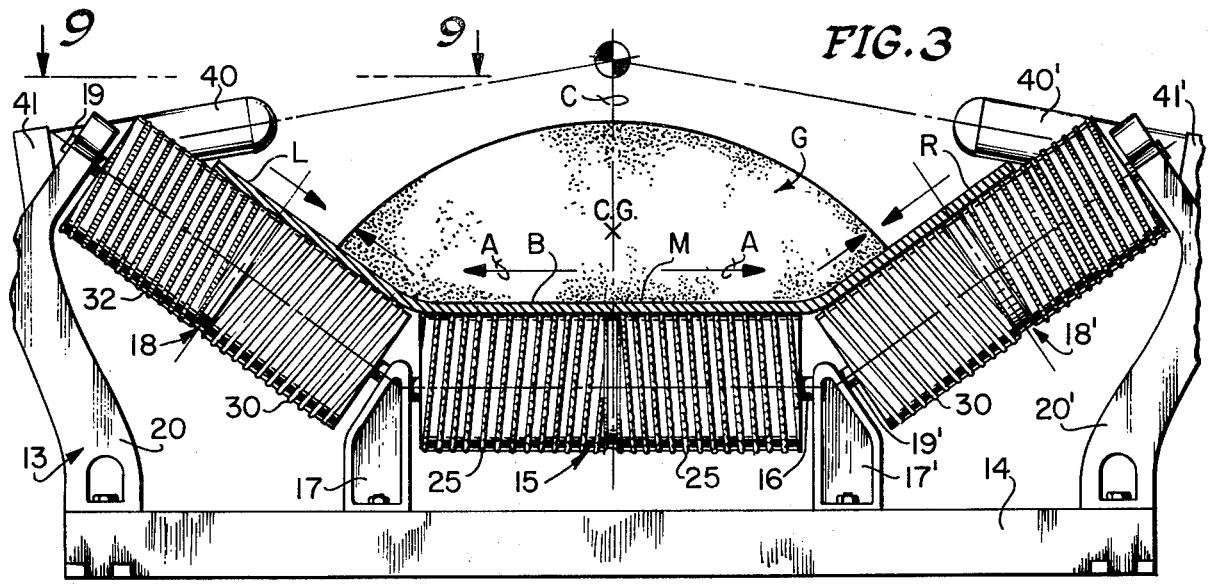
FIG. 3 is a cross section through the troughing conveyer of FIG. 1 looking downstream along lines 3—3 therein and at larger scale with respect thereto.

Referring to FIGS. 1 and 2, a troughing conveyor generally designated 10 is shown to include a driving roller 11 and a return roller 12 around which an endless belt B is trained. Between the driving and return rollers 11 and 12 are a plurality of idler troughing roller units 13.

Each idler troughing roller unit 13 (FIGS. 3, 4 and 5) includes a base frame 14 having a medial roller 15 on a horizontal shaft 16 journaled between a pair of brackets 17—17' extending upwardly from the base 14. At each end of the base frame 14 a side wall idler roller 18 and 18' has a shaft 19—19' journaled for rotation between a respective medial bracket 17—17' and an outside bracket 20 and 20' respectively. The side wall rollers 18—18' are thus supported in an angular disposition from a high extremity on the outside bracket 20 and 20' to a low point at the medial bracket 17—17'. By this arrangement the medial and side wall rollers 15, 18, and 18', respectively, are disposed in a condition in which they tangently engage the load-carrying upper reach of the belting B for supporting the latter in the shape of a trough.

The belting B in trough shape is normally centered between the slanted side edges L and R of the belt which are equally spaced from the horizontal center section M of the belt. The major portion of the trough-shaped belting is normally maintained centered by spiralled ribbing on the medial and side wall rollers 15, 18 and 18'. In a conventional manner the spiralled ribbing turns screw fashion such as to tend outwardly and to spread the belting equally from longitudinal center C of the trough toward the side edges thereof. Under such conditions it is assumed that a load of granular material G will remain centered on the troughed belting in the manner as illustrated in FIGS. 3 and 5.

DETAILED DESCRIPTION OF THE INVENTION

In accordance with the present invention the medial roller 15 of the troughing rollers is provided with spirally-coiled wire ribbing 25 having a waveform. The waveform, FIG. 6, consists of in-and-out undulations 26 formed in the wire ribbing 25 which is set into spiral grooves 27 formed in the periphery 28 of the roller 15. The in-and-out undulations 26 are radially disposed relative to the roller 15 such that the undulations afford a gripping action against the belting upon engagement thereof with the roller 15. Such waveform ribbing is more specifically described and claimed in my U.S. Pat. No. 3,713,348 entitled "Centerline Tracking Rollers for Closed Loop System."

With the material G centered on the trough formed reach of the belt B, the weight of the material weighs the belt down upon the waveformed ribbing of the medial roller such that the raised part of the undulations 26 press into the belt surface. This assists the spiral ribbing 25 in having firm, non-slip traction with the belting. With the ribbing 25 spirally tending outwardly from trough center, the belting is spread uniformly outwardly from belt center as indicated by the arrows A in FIG. 3.

To assist the medial roller 15 in maintaining the belt centered thereon each of the side wall idler rollers 18—18' having ribbing 30 halfway up their lower peripheries. This ribbing 30 may be plain wire 31 seated in spiral grooves formed in the roller surface and spirally tending outwardly from medial brackets 17—17' so as to assist the medial roller 15 in maintaining the center section M of the belting B in centered relation to the medial rollers.

Figure 4:
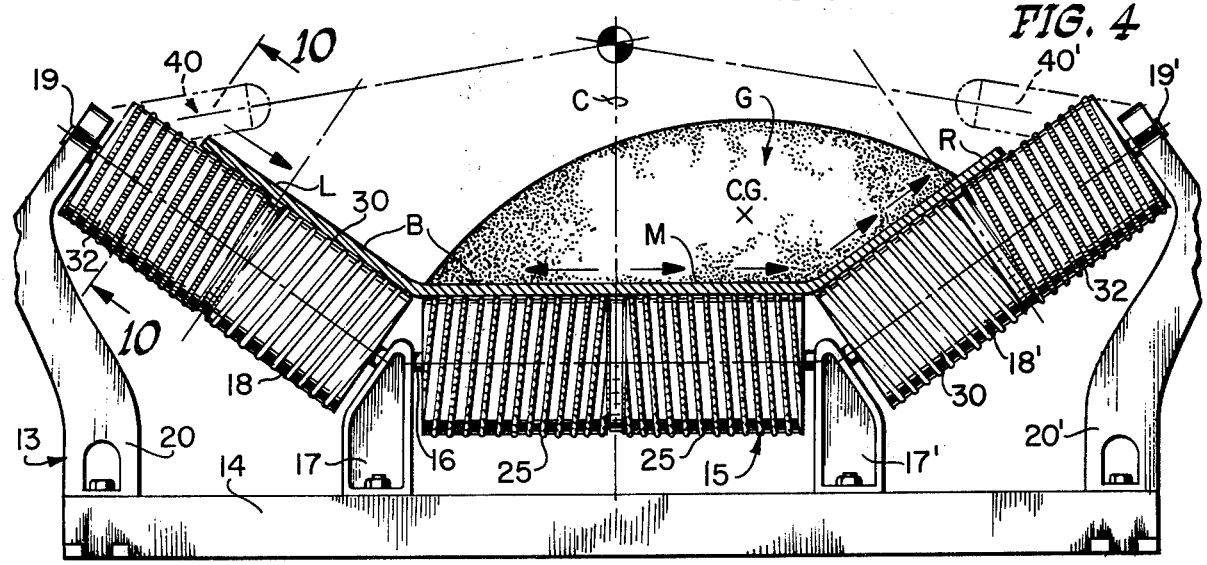
FIG. 4 is a cross section similar to that of FIG. 3 showing the counteracting feature relative to an off-center load.

Under normal circumstances the load of granular material G will seek bottom by gravity in the trough-formed belting. However, whenever the material G tends to shift from trough center C toward one or the other side, for example, right-hand slanted side edge R of the belt as depicted in FIG. 4, means are provided for counteracting the belt edge R or L, as the case may be, from climbing further outward relative to the slanted rollers 18—18'. This means comprises inwardly-tending spiralled ribbing 32 on the outer half of each of the slanted side wall idler rollers 18—18'.

It should be noted (FIG. 4) that the granular material G is shifted up the slanted right edge R of the belting B and tends to weigh the latter down firmly on the counteracting inwardly-tending spiralled ribbing 32 of the roller 18'. The inwardly-tending ribbing 32 thus engaged cancels out, in part, the effect of the outwardly-tending spiralled 30 on the lower half of the right-hand idler roller 18' in FIG. 4. Moreover, the weight of the granular material G thus shifted has a tendency to cause the entire trough-formed belting B to shift in a direction opposite the inclined right-hand edge R of the belting. As a result of this lateral shift of the belting B, the opposite slanted edge L of the belting is shifted upwardly on the left-hand slanted idler roller 18 on the opposite side of the troughing roller unit 13. When this occurs, the inwardly-tending spiralled ribbing 32 on the left-hand slanted roller 18 comes into play by resisting the tendency of the left-hand edge L of the belting to climb further upwardly on the extreme or outer half of the roller 18. In other words, the inwardly-tending spiralled ribbing 32 on the left-hand slanted roller 18 combines with the outwardly-tending spiralled ribbing 25 on the right-hand half of the medial roller 15 and the outwardly-tending spiralled ribbing 30 on the lower half of the right-hand slanted roller 18' to counteract the tendency of the load of granular material G to shift the belting further to the left.

To increase the effectiveness of the inwardly-tending spiralled ribbing 32 on either of the slanted outer side wall idler rollers 18 and 18' in obtaining more positive traction with the belting engaged thereby, the ribbing 32 is provided with a scalloped tangent belt engaging surface 35. A detail of such surfacing 35 is illustrated in FIGS. 7 and 8, and is more particularly disclosed, described and claimed in my U.S. Pat. No. 3,812,732 entitled "Scalloped Belt Engaging Tangent for Ribbing on Centering and Idler Tracking Rollers."

The scalloped tangent belt-engaging surface 35 consists of a plurality of V-shaped grooves 36 formed transversely across the tangent periphery of the ribbing 32. The grooves 36 are equally spaced to form an oval-shaped dent or depression in the tangent periphery of the ribbing between identical lands 37 on the belt-engaging tangent surface of the ribbing 32. The lands 37 are of lesser dimension than the open face of the grooves, lengthwise of the ribbing 32. The arrangement is such that the undersurface of the belting B is engaged by the lands 37 between portions of the belting which extend into the oval-shaped dents or depressions formed by the grooves 36.

Each of the lands 37 is provided with a tooth-like apex 38 on one side only of the oval-shaped depression formed by the V-shaped groove 36. The tooth-like apex is preferably disposed on the trailing side of the V- shaped groove 36 in relation to the direction of rotation of the ribbing 32 on the rollers 18—18′.

The surface of the belting B facing the idler rollers 18—18′ falls between the lands 37 and each crescent-shaped in conformity with the edge of the oval depression along which it is formed. The tooth-like apex is preferably disposed on the trailing side of the V-shaped groove 36 in relation to the direction of rotation of the ribbing 32 on the rollers 18—18′.

The surface of the belting B facing the idler rollers 18—18′ falls between the lands 37 and each crescent-shaped apex 38 affords a gripping action against the belt surface. This provides a more positive traction between the ribbing 32 on the outer halves of the rollers 18—18′ and a more effective influence of the inwardly-tending spiral action of such ribbing 32 upon the belting. This more effective positive traction between the ribbing 32 and belt surface overcomes and counteracts the collective influence of the outwardly-tending plain ribbing 30 on the inner or lower halves of the slanted side rollers 18—18′ and more so when the weight of the granular material G is applied to the belting.

Referring to FIG. 4, it will be noted that with the belt off-center illustrated, a greater area of undersurface of the belting B engages the scalloped tangent ribbing 32 on the left-hand slanted idler roller 18 than engage the ribbing 32 on roller 18′. The more surface contact being on the opposite side of the trough relative to the offset load, the greater the influence of the inwardly-tending spiralled ribbing 32 on the opposite side. This combined with the influence of the outwardly-tending ribbing 25 on the right side of the medial roller 15 and the ribbing 32 on the inner or lower end of the slanted roller 18′ beneath the load-bearing side of the troughed belting tends to urge the belting back toward a centered position relative to the troughing roller unit 13.

It should here be noted that the illustration in FIG. 4 represents an case of caseof lateral shifting of the load G wherein the belt side L opposite the center of gravity CG of the load climbs well beyond halfway up the outer half of the supporting side wall roller 18. To guard against further movement of the belt edge beyond a safe level along a side roller, each outer bracket 20—20′ may be provided with an auxiliary roller 40—40′, respectively. These auxiliary rollers are not for the purpose of merely bearing against the side edge of the belting which would cause a wearing action against the belt edge, but instead are set at an angle relative to the inclined side edge of the belting so as to provide a V-shaped valley therebetween. As is perhaps better illustrated in FIGS. 9 and 10, as this belt edge moves into engagement with the auxiliary roller 40, the belt edge is depressed against roller 18 so that it contacts a larger area of surface of the roller as it partially wraps therearound. In most cases, just a feather touch of the belt edge into this V-shaped valley is sufficient to overcome further movement of the belting in that direction and to allow the scalloped tangent belt engaging surface 35 on the slanted roller 18 or 18′ to counteract further movement of the belting in that direction.

The auxiliary rollers 40—40′ are each mounted on a base 41—41′ supported on or formed as a part of the outside bracket 20—20′, respectively. The axis of the auxiliary roller 40 or 40′ is disposed on the pulling side of the slanted side wall rollers with which it is related. In other words, on that side of the roller 20 or 20′ where the belting is leaving contact with such roller. This too cooperates with the inwardly-tending spiralled ribbing 32 on the slanted side rollers 18 or 18′ in urging the belting back down toward trough center. It is not a forceful rubbing action but a gentle touch sufficient to cooperate with the pitch of the spiralled ribbing 32 in effecting a downward trend to the belting.

Figure 9:
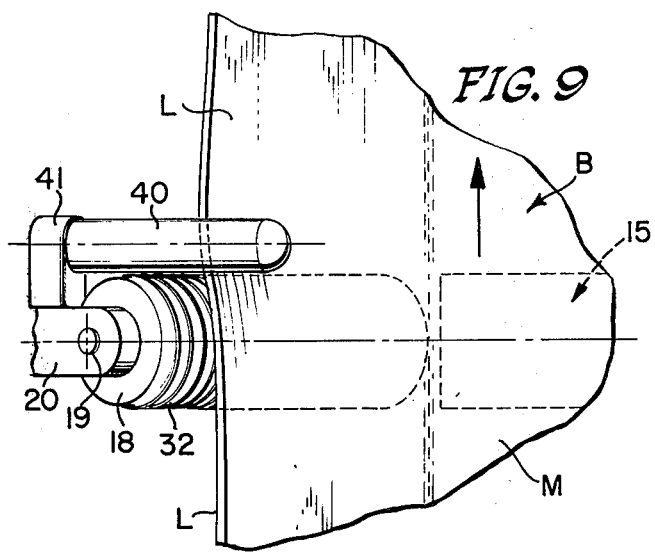
FIG. 9 is a fragmentary plan view of one side of the troughing conveyor as seen from line 9—9 of FIG. 3.
Figure 10:
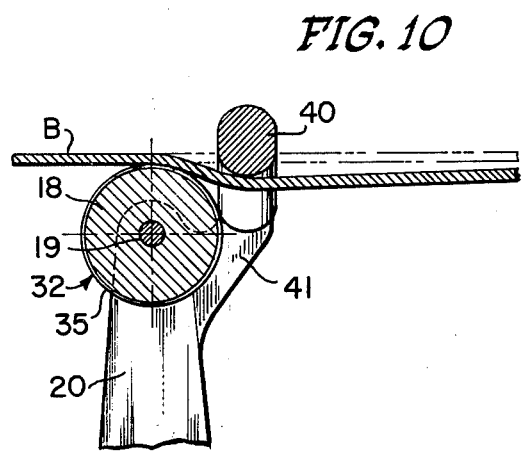
FIG. 10 is a fragmentary sectional detail taken substantially along line 10—10 in FIG. 4.

It is possible that the granular material G on the belting B be unevenly distributed, such as would occur when a greater quantity of the material is poured into the trough as a pile. In such event, the weight of such pile of material G may so weigh the belting down upon the inwardly-tending spiralled ribbing 32 on the right-hand slanted roller 18′ therebeneath that the latter will have greater effect than the counteracting influence of the inwardly-tending spiralled ribbing 32 on the outer half of an opposite slanted roller 18. Should that occur, the edge L on the opposite side of the load on the trough (FIG. 4) would climb higher upon the slanted roller 18, for example as depicted in FIGS. 9 and 10. To overcome such a condition the auxiliary rollers 40—40′ come into play by bearing down upon the belt edge L to effect a wrap around influence on the belt edge as shown in FIG. 10. Thus, a greater area of the lower surface of the belting engages the scalloped tangent belt-engaging surface 35 of the spiralled ribbing 32 on roller 18. Since this scalloped tangent belt-engaging surface 35 affords greater and more positive traction in relation to the belt surface engaged thereby the greater the surface contact between the belt and ribbing 32 on the lee roller 18, the greater the counteracting influence thereof relative to the ribbing 32 on the opposite roller 18′ engaged by that portion of the belting beneath the pile of granular material in the trough. As a result of this arrangement there is assurance that the belting will always be maintained in or as close as possible to centered relation with the troughing rollers 13 as the belting leaves each set or unit thereof.

From the foregoing it will be appreciated that in a troughing roller units as described are designed in a manner to create complete harmony between the various phases of the ribbing on the several roller sections 15, 18 and 18′ of each unit 13. It should here be noted that the pitch on the several phases of the ribbing may be calculated to the need of every type of troughing conveyor. In other words in some cases where the granular material G is of light weight by volume, the self-centering action is most effective. However, with material G such as minerals, gravel and the like, the weight by volume is greater and more effective pitch on the spiralled ribbing is required.

Referring to FIGS. 1 and 2, it will be noted that the pulling or driving roller 11 as well as the return roller 12 each have spiralled ribbing comparable to that on the troughing roller units. This is indicated by dotted lines and numerals with prime exponents to show the relation thereto. As a result of this feature, the belting B is constantly urged into centered relation relative to the driving and return rollers 11 and 12.

It will further be noted that for reasons explained in detail in my prior U.S. Pat. No. 3,713,348, one of the sets of end rollers 11 and 12 is provided with spiralled ribbing which is of conveying configuration and the other set of end rollers is provided with rollers of an expanding configuration. Moreover, in order to prevent sailing of the return portion of the belting 22, the lower return idler rollers shown in FIGS. 1 and 2 may also be provided with expanding and converging ribbing. In a preferred embodiment in which the conveyor is quite long, it has been found most beneficial to provide the lower return idler rollers with alternating expanding (E) and converging (C) ribbing as is indicated in the case of the S-wrapped rollers at the right side of FIG. 2.

Another feature of the present invention is that in the case of the S-wrapped rollers shown in FIG. 2, the pitches of the ribbings on the respective rollers can be made different to improve the centering control. For example, with the belt contact on each S-wrapped roller being at least 180° and with the ribbing on one of these rollers having a converging three-pitch configuration and the other having an expanding two-pitch configuration, superior self-centering action can be achieved. The differing pitches also cause unwrinkling of the web to occur as the web flows out of the converging pulley and directly into the expanding pulley which has a smaller ribbing pitch. It has been found that an S-wrapped pulley set as described can be used at any position along a conveyer process line to achieve excellent self-centering action. For very long conveyers, it may be desirable to use several such sets to provide a high degree of belt stability. This principle may be used in any type of process line including those having belting of thick films, thin films, metals, paper, plastics, etc.

Having thus described the structure for self-centering troughing rollers in specific detail, it will be appreciated by those skilled in the art that the same may be varied, modified and/or altered without departing from the spirit or scope of my invention therein as set forth in the appended claims.

I claim:

1. In a troughing conveyor of the type having an endless belt trained over a drive roller and a return roller, and a plurality of idler roller units interspersed therebetween, each of said idler roller units including a roller supporting frame, a horizontally journaled medial roller, and a pair of upwardly slanted side rollers disposed one at each end of the medial roller for supporting the side portions of the belt in slanted, trough forming disposition; an improved idler roller unit for self-centering the belt relative to the rollers and for counteracting the tendency of the belt to climb one slanted side roller due to the weight of an off-centered load on the opposite side thereof, comprising in combination:
   a medial roller having a pair of spirally tending, belt engaging ribs with each rib tending outwardly from the center of the roller for spreading a central portion of the belt engaged thereby widthwise; and
   a pair of slanted side rollers disposed one at each end of said medial roller with the inside end of each side roller being located immediately adjacent an end of said medial roller and the outside end of each side roller being elevated relative to said medial roller, each of said side rollers having an outwardly tending, spiralled, belt engaging rib on the inner, lower-most disposed half of the length thereof for urging the slanted side portion of the belt engaged thereby outwardly and upwardly, and each of said side rollers having an inwardly tending, spiralled, belt-engaging rib on the outer, uppermost disposed half of the length thereof for urging the slanted side portion of the belt engaged thereby inwardly and downwardly to counteract any tendency of the belt to move off-center due to the effects of an off-centered load.

2. An improved idler roller unit as recited in claim 1 including an undulating waveform in the spiralled ribbing on said medial roller for effecting non-slip engagement with the belting engaged thereby.

3. An improved idler roller unit as recited in claim 2 including plain spiralled ribbing on the inner lower half of the length of each of said slanted side wall rollers for cooperating with the undulating waveformed ribbing on said medial roller in spreading the belting engaged thereby equally widthwise from belt center.

4. An improved idler roller unit as recited in claim 2 including a scalloped tangent belt engaging surface on the inwardly tending spiralled rib on the outer half end of each of said side rollers for grippingly engaging the side edges of the belting to afford greater traction than and for counteracting the effect of the outwardly-tending spiralled ribbing on said medial roller and the inner, lower ends of said slanted side rollers.

5. An improved idler roller unit as recited in claim 4 in which the waveforms on adjacent convolutes present spirally-tending waveforms lengthwise outwardly from center of said medial roller for equally urging the side edges of said belting outwardly from longitudinal center thereof.

6. An improved idler roller unit as recited in claim 1 in which said inwardly-tending spiralled ribbing on the outer, upper end of each slanted side wall roller comprises a round stock having uniformly spaced V shaped grooves formed transversely the length thereof on its belt engaging tangent and intermediate belt engaging lands therebetween for positively gripping the surface of the belting engaged thereby with greater traction against the latter than that afforded by the outwardly-tending spiralled ribbing on said medial roller and the inner lower end of each of said slanted side wall rollers.

7. An improved idler roller unit as recited in claim 2 in which said inwardly-tending spiralled ribbing on the outer, upper end of each slanted side wall roller comprises a round stock having uniformly spaced V shaped grooves formed transversely the length thereof on its belt engaging tangent and intermediate belt engaging lands therebetween for positively gripping the surface of the belting engaged thereby with greater traction against the latter than that afforded by the outwardly-tending spiralled waveform ribbing on said medial roller and that of the inner lower end of each of said slanted side wall rollers.

8. An improved idler roller unit as recited in claim 5 in which said scalloped tangent belt engaging surface of said inwardly-tending spiralled rib on the outer end of each of said side rollers includes a barb adjacent one edge of each of said scalloped for positive traction against the side edges of the belting engaging said slanted side rollers for counteracting the outwardly-tending action thereto by said spiralled ribbing on said medial rollers and the inner ends of said slanted side rollers.

9. An improved idler roller unit as recited in claim 6 in which said scalloped tangent belt engaging surface of said inwardly-tending spiralled rib on the outer end of each of said slanted rollers includes a barb adjacent one edge of each of said lands on the trailing side of the V shaped grooves for positive tractional engagement against the surface of the belting engaged thereby for counteracting the outwardly-tending action afforded by said spiralled ribbing on said medial rollers and the inner ends of said slanted side rollers.

10. An improved idler roller unit as recited in claim 4 and further comprising:

a pair of auxiliary rollers mounted to said frame and disposed on the trailing side of said side rollers with one end of each auxiliary roller being disposed adjacent to the outermost end of one of said side rollers and the other end of each of said auxiliary rollers extending inwardly of the outermost end of the adjacent side roller and above and inwardly of the corresponding side edge position of the normally centered belt, whereby the upper surface of an edge portion of an off-centered belt will engage one of said auxiliary rollers and be pressed thereby more firmly downwardly against the inwardly-tending spiralled rib on the outer half of said adjacent side roller.

11. An improved idler roller unit as recited in claim 1 and further comprising:

a pair of auxiliary rollers mounted on one side of said side rollers with one end of each auxiliary roller being disposed adjacent to the outermost end of one of said side rollers and the other end of each of said auxiliary rollers being disposed inwardly of the outermost end of the adjacent side roller and above the position of the edge portion of the centered belt, whereby the upper surface of an edge portion of an off-centered belt will engage one of said auxiliary rollers and be pressed thereby more firmly downwardly against the inwardly-tending spiralled rib on the outer half of said adjacent side roller.

12. A troughing conveyor comprising:

support means;

a drive roller supported at one position by said support means;

an end return roller supported by said support means at a second position remote from said first position;

a plurality of idler roller units serially disposed between said drive roller and said end return roller, each being supported by said support means and each including, a medial roller having a pair of spirally tending belt engaging ribs with each rib tending outwardly from the center of the roller for spreading a belt engaged thereby widthwise, and a pair of slanted side rollers disposed one at each end of said medial roller with the inside end of each side roller being located immediately adjacent an end of said medial roller and the outside end of each side roller being elevated relative to said medial roller, each of said side rollers having an outwardly-tending spiraled belt engaging rib on the inner, lowermost disposed half of the length thereof for urging the slanted side edges of a belt engaged thereby outwardly and upwardly on each side of said medial rollers, and each of said side rollers having an inwardly-tending spiraled belt engaging rib on the outer, uppermost disposed half of the length thereof for engaging the edge portions of a belt and for counteracting any tendency of the belt to climb outwardly and upwardly relative thereto;

a plurality of return idler rollers serially disposed between said drive roller and said end return roller; and a continuous webb wrapped around said drive roller, threaded alternately above and below adjacent ones of said return idler rollers, wrapped around said end return roller, and disposed across the top surfaces of the rollers of said idler roller units.

13. A troughing conveyor as recited in claim 12 wherein said drive roller is provided with spirally-tending ribbing of a converging configuration and said end return roller is provided with spirally tending ribbing of an expanding configuration.

14. A troughing conveyer as recited in claim 13 wherein at least one of said return idler rollers is provided with spirally tending ribbing of an expanding configuration and at least one other one of said return idler rollers is provided with spirally tending ribbing of a converging configuration.

15. A troughing conveyer as recited in claim 14 wherein the two return idler rollers positioned closest to said drive roller are disposed relative to each other so as to cause said webbing in passing thereover to trace an S-shaped path.

* * * * *